United States Patent
Devitt

(10) Patent No.: US 11,767,883 B2
(45) Date of Patent: Sep. 26, 2023

(54) EXTERNALLY PRESSURIZED POROUS GAS BEARINGS OR SEALS OPERATING ON REFRIGERANT UTILIZING SHEAR HEAT FROM ROTATING SHAFT TO ACHIEVE INCREASED LOAD CAPACITY

(71) Applicant: NEW WAY MACHINE COMPONENTS, INC., Aston, PA (US)

(72) Inventor: Andrew Devitt, Media, PA (US)

(73) Assignee: NEW WAY MACHINE COMPONENTS, INC., Aston, PA (US)

( * ) Notice: Subject to any disclaimer, the term of this patent is extended or adjusted under 35 U.S.C. 154(b) by 0 days.

(21) Appl. No.: 18/087,604

(22) Filed: Dec. 22, 2022

(65) Prior Publication Data

US 2023/0130841 A1    Apr. 27, 2023

Related U.S. Application Data

(63) Continuation of application No. 17/391,817, filed on Aug. 2, 2021, now Pat. No. 11,536,316, which is a continuation of application No. 16/554,570, filed on Aug. 28, 2019, now Pat. No. 11,078,957.

(60) Provisional application No. 62/723,894, filed on Aug. 28, 2018.

(51) Int. Cl.
    *F16C 32/06*    (2006.01)

(52) U.S. Cl.
    CPC ...... *F16C 32/0666* (2013.01); *F16C 32/0614* (2013.01); *F16C 32/0618* (2013.01); *F16C 2360/00* (2013.01)

(58) Field of Classification Search
    CPC .............. F16C 32/0614; F16C 32/0618; F16C 32/0622; F16C 32/064; F16C 32/0644; F16C 32/0666; F16C 32/0674; F16C 2360/00; F25B 2400/07
    See application file for complete search history.

(56) References Cited

U.S. PATENT DOCUMENTS

| | | | |
|---|---|---|---|
| 6,404,845 | B1 | 6/2002 | Sharpless et al. |
| 6,872,002 | B2 | 3/2005 | Tomita et al. |
| 2001/0048779 | A1 | 12/2001 | Mauro |
| 2010/0183253 | A1 | 7/2010 | Hirata |
| 2011/0085752 | A1 | 4/2011 | Tecza et al. |
| 2018/0023584 | A1 | 1/2018 | Morgan et al. |
| 2018/0066705 | A1 | 3/2018 | Devitt |
| 2018/0087573 | A1 | 3/2018 | Iannello |
| 2019/0072134 | A1 | 3/2019 | Rajendran et al. |
| 2019/0376555 | A1 | 12/2019 | Jeung et al. |
| 2019/0376556 | A1 | 12/2019 | Jeung et al. |

*Primary Examiner* — Alan B Waits
(74) *Attorney, Agent, or Firm* — VOLPE KOENIG

(57) ABSTRACT

An externally pressurized porous gas bearing for operating within a refrigerant environment is disclosed. The gas bearing utilizes shear heating from rotation of a rotor, thereby increasing the pressure and load capacity of the externally pressurized porous gas bearing. The gas bearing is capable of operating when the refrigerant is in a liquid phase and when the refrigerant is in a gaseous phase.

7 Claims, 4 Drawing Sheets

EXTERNALLY PRESSURIZED POROUS GAS BEARINGS OR SEALS OPERATING ON REFRIGERANT UTILIZING SHEAR HEAT FROM ROTATING SHAFT TO ACHIEVE INCREASED LOAD CAPACITY

CROSS REFERENCE TO RELATED APPLICATION

This application is a continuation of U.S. patent application Ser. No. 17/391,817 filed Aug. 2, 2021, which is a continuation of U.S. patent application Ser. No. 16/554,570 filed Aug. 28, 2019, which issued on Aug. 3, 2021 as U.S. Pat. No. 11,078,957, which claims the benefit of U.S. Provisional Application No. 62/723,894, filed on Aug. 28, 2018, both of which are incorporated by reference as if fully set forth.

FIELD OF INVENTION

The present application provides externally pressurized porous media technology to create a porous media bearing and/or seal for turbomachinery applications that involve the use of refrigerant.

BACKGROUND

Gas bearings are a particular type of bearing which uses pressurized gas, such as air, to maintain a gap between a rotating component and a bearing surface to reduce friction. Turbomachinery applications may involve the use of refrigerant or other media which can change phases (e.g., from a gas to a liquid) during operation. Currently, gas bearings do no operate when the media is in a liquid phase. It would be desirable for gas bearings to operate on the media, regardless of its phase.

SUMMARY

Briefly stated, the invention provides an externally pressurized gas bearing technology for use in turbomachinery equipment that utilizes refrigerant or other media which can change phases during operation, These bearings may operate regardless of whether the refrigerant is in a liquid phase or a gaseous phase. Specifically, an externally pressurized porous gas bearing is disclosed which utilizes shear heating from rotation of a rotor, thereby increasing the pressure and load capacity of the externally pressurized porous gas bearing. The disclosed gas bearing may operate regardless of whether the refrigerant is in a liquid phase or a gaseous phase.

BRIEF DESCRIPTION OF THE DRAWINGS

The foregoing summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
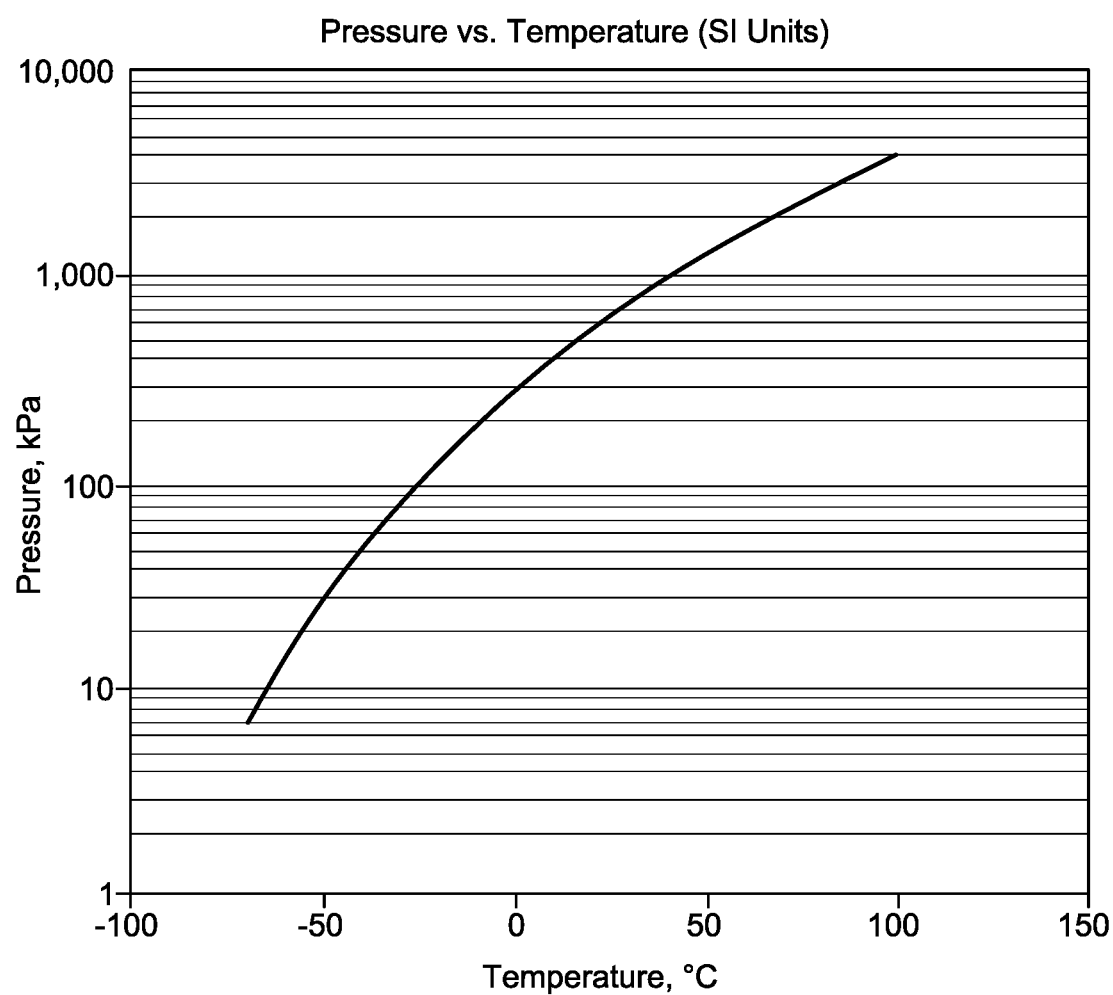
FIG. 1 is a graph of Pressure vs. Temperature for a type of refrigerant.

Certain terminology is used in the following description for convenience only and is not limiting. The words "front," "back," "left," "right," "inner," "outer," "upper," "lower," "top," and "bottom" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

Disclosed is an externally pressurized porous gas bearing technology for use in turbomachinery equipment that utilizes refrigerant, or other media which can change phases during operation. The disclosed gas bearing may operate regardless of whether the refrigerant is in a liquid phase or a gaseous phase. A common refrigerant used in such turbomachinery is R-134a.

The porous gas bearings of the present disclosure contain a porous media. The porous media may comprise any porous or sintered material, including but not limited to graphite, carbon, silicon carbide, tungsten carbide, alumina, carbon-carbon ceramic matrix composites or the like, 3D printed materials, or other similar materials. The porous gas bearings of the present disclosure may be radial or axial (i.e., thrust bearings).

Basic operation of porous gas bearings in accordance with the present disclosure are described, for example, in U.S. Pat. No. 8,753,015, issued Jun. 17, 2014, U.S. Publication No. 2014/0286599, filed Nov. 20, 2013, and U.S. Provisional Application No. 62/697,728, filed Jul. 13, 2018, which are hereby incorporated by reference in their entirety.

FIG. 1 is a graph of Pressure vs. Temperature refrigerant R-134a from "*Freon*™ 134*a Refrigerant (R-134a), Properties, Uses, Storage, and Heating*" by Chemours™. As shown in the graph, an increase in the temperature of the refrigerant results in an increase in the pressure of the refrigerant, causing a phase change from a gas to a liquid. In externally pressurized porous media gas bearings, a phase change is less likely. This is because the pressure supplied to the externally pressurized gas bearings will dictate the load capability of the bearings. Having liquid in the gap will not increase the load capacity, but rather cause extra shear, thereby resulting in an efficiency drop. However, shear heat resulting from a shaft rotating in the externally pressurized gas bearings may increase the pressure in the gap, and thus increase the load carrying capacity of the bearing.

Currently, two-phase or liquid phase refrigerant may be used in the gap of a gas bearing as a way of increasing the restriction in the gap. The viscosity of a liquid increases the restriction in the gap, which provides pressure for extra load capacity. However, this is a very narrow field of use and a poor choice from a gas bearing design perspective. Further, this indicates that the gas bearing design includes relatively large gaps.

Porous media gas bearings in accordance with the present disclosure comprise porous media to serve as a restriction. The porous media creates restrictions in the gap. In doing so, the pressure in the gap keeps the refrigerant as a gas. As such, the issue of phase changes in the gap is eliminated. Further, the gas bearings of the present disclosure may use shear in the relatively small gaps to increase the load capacity of the bearing.

It is well known that heating contained refrigerant will increase the pressure. Currently, refrigerant may be heated in a heating tank before introducing the refrigerant into the gap.

The gas bearings of the present disclosure use the shear of the shaft at speed as a heat source to increase the pressure in the gap by heating the refrigerant, and thus the load capacity of the bearing.

The temperature rise in the gap of the gas bearing of the present disclosure is provided by Equations 1 and 2:

$$\Delta T_{RISE} = f(\text{Power}/[C_P * \text{mass flow}]) \quad \text{Eq. 1}$$

$$\text{Power} = f([1/\text{gap}] * [\text{dynamic viscosity} * \text{shaft speed}^2 * \text{shaft radius}^3 * \text{bearing geometry}]) \quad \text{Eq. 2}$$

Figure 2:
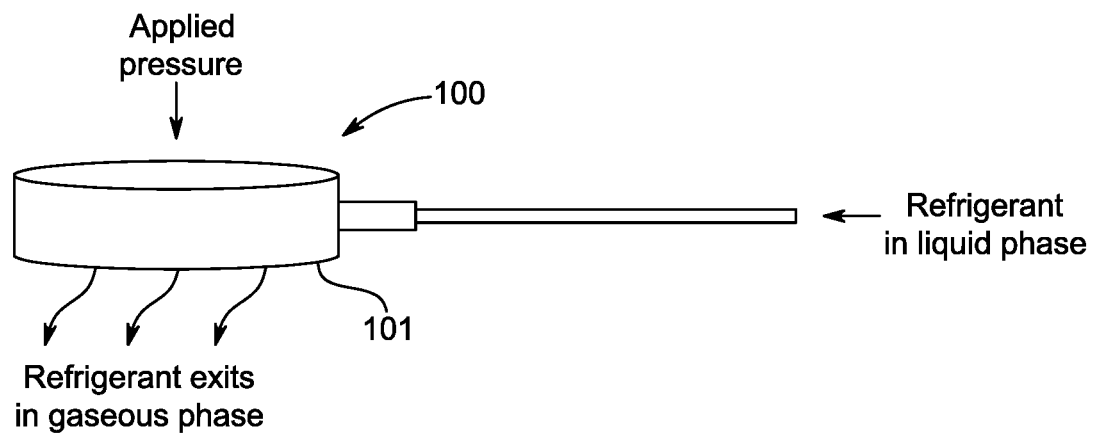
FIG. 2 is a perspective view of an example gas bearing in accordance with the present disclosure when pressure is applied to the bearing.

When pressure is applied to the porous media gas bearing 100 of the present disclosure, only gas exits the bearing face. For example, if liquid refrigerant enters the gas bearing via an input tube and pressure is being applied to the gas bearing to maintain a relatively small bearing gap with high pressure in the gap, only gas, no liquid, escapes the bearing face 101. FIG. 2 is an example of liquid entering the gas bearing 100 while pressure is being applied to the bearing.

Figure 3:
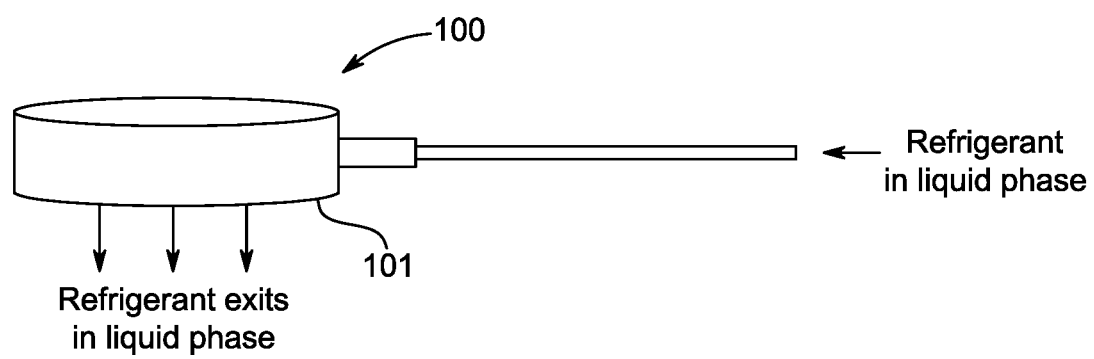
FIG. 3 is a perspective view of the example gas bearing of FIG. 2 when pressure is not applied to the bearing.

If no pressure is applied to the porous media gas bearing, and therefore there is no pressure in the pressure gap, liquid exits the bearing face 101. FIG. 3 is an example of liquid entering the gas bearing 100 while pressure is being applied to the bearing.

A similar phenomenon is observed in rotating turbomachinery using the gas bearings of the present disclosure. As described above, the shear heating in the gap of the gas bearing raises the pressure in the gap, thereby increasing the load carrying capacity of the porous media gas bearing of the present disclosure. In addition, the increase in shear heat in the gap from rotation of the rotor, may cause the refrigerant to stay in the gaseous phase.

Figure 4:
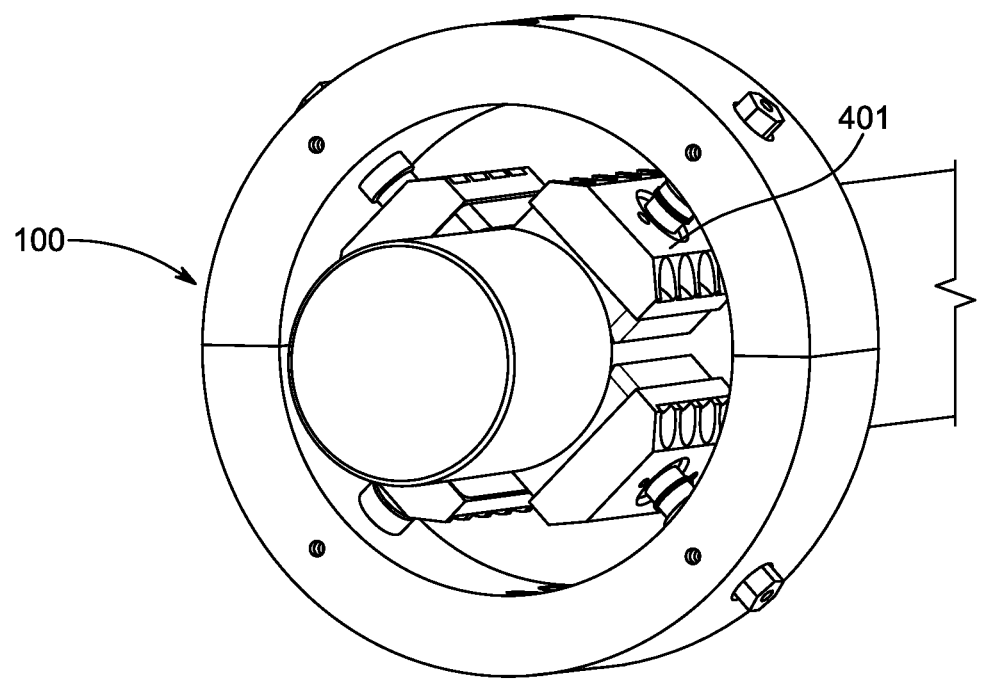
FIG. 4 is a perspective view of a gas bearing comprising stud-mounted pivots in accordance with the present disclosure.

FIG. 4 illustrates an embodiment in which the gas bearing 100 comprises stud-mounted pivots 401 for adjustable compliance. In an alternate embodiment, pivots including belleville washers may be used. The stud-mounted pivot 401 and belleville washers create a pre-load. The pre-load causes a desired pressure in the gap of the gas bearing, which allows for further shear heating. The shear heating in turn raises the pressure in the gap resulting in a higher load capacity.

Figure 5:
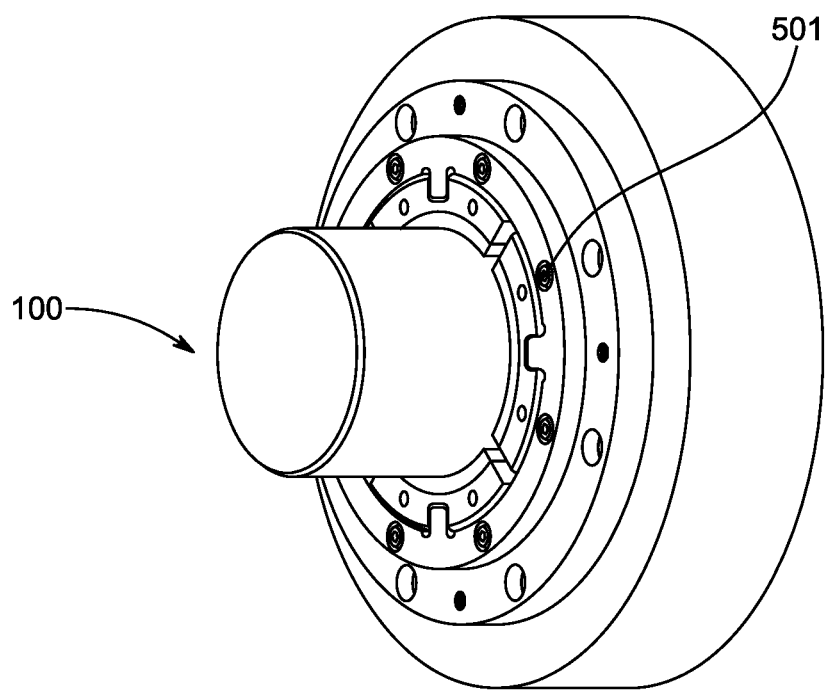
FIG. 5 is a perspective view of a gas comprising using elastomeric pivots in accordance with the present disclosure.

FIG. 5 illustrates an embodiment in which the gas bearing 100 comprises elastomeric pivots 501 for adjustable compliance. The elastomeric pivots 501 create a pre-load. The pre-load causes a desired pressure in the gap of the gas bearing, which allows for further shear heating. The shear heating in turn raises the pressure in the gap resulting in a higher load capacity.

Figure 6:
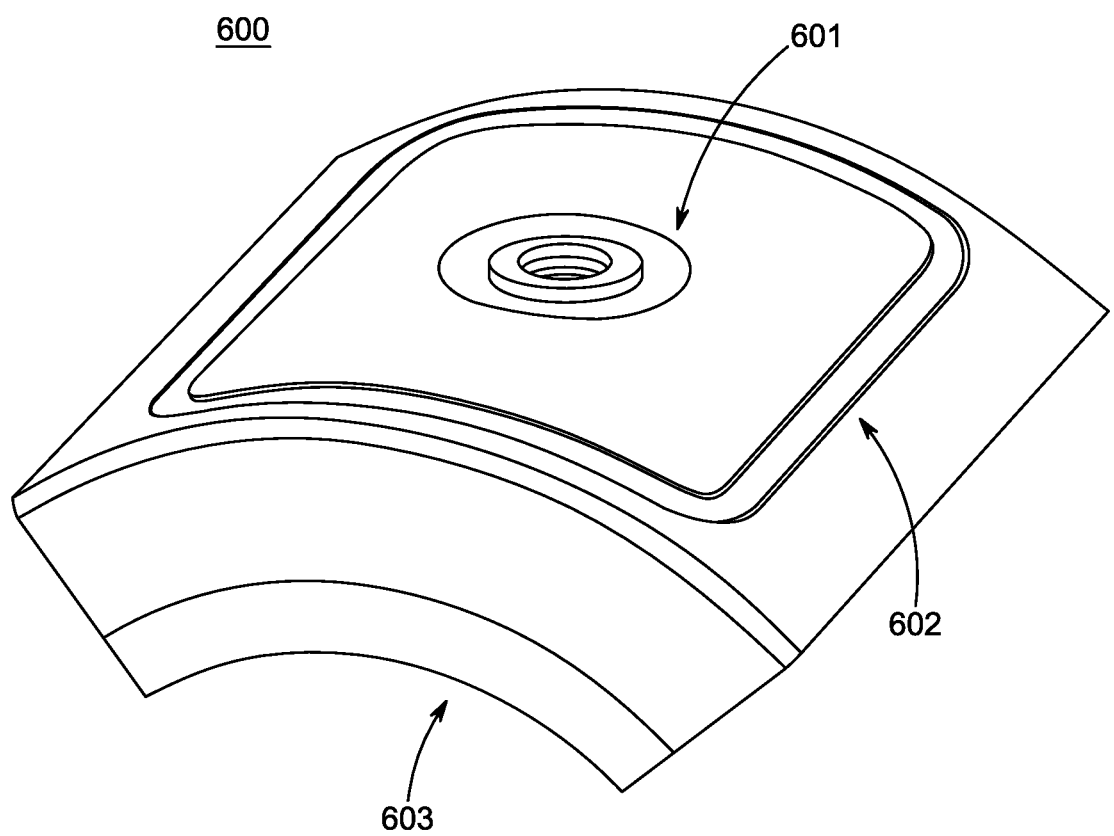
FIG. 6 is a perspective sectional view of a bearing pad in accordance with the present disclosure.

FIG. 6 illustrates a perspective sectional view of a bearing pad 600 in accordance with the present disclosure. In embodiments, the bearing pad may be configured to create a deterministic pre-load in the bearing gap. The gas bearing may include a center o-ring 601 and an outer o-ring 602. The center o-ring 601 and the outer o-ring 602 may be passive devices that provide compliance. Additionally or alternatively, an external pressure or vacuum may be introduced between the center o-ring 601 and the outer o-ring 602 through a port contained in a cartridge/bearing housing (not shown). The pressure or vacuum may be used for a variety of purposes, including but not limited to providing externally controlled adjustment to the stiffness of the bearing, externally controlled adjustment of the gap between the outer diameter of a shaft and the inner diameter of the porous media 603, externally controlled adjustment of damping, or any other positional or desired control that needs to be accomplished for the bearing via externally controlled pressure or vacuum. In embodiments, multiple o-rings may be included on the back side of the pad, with separate inputs. The o-rings as described allow for additionally adjustability that may be accomplished externally, resulting in a deterministic pre-load on the pad to accomplish the desired pressure in the gap, allowing for shear heating. Shear heating results in a higher gap pressure, which results in a higher gap pressure, which in turn increases the load capacity, as described above.

While preferred embodiments have been set forth in detail with reference to the drawings, those skilled in the art who have reviewed the present disclosure will readily appreciate that other embodiments can be realized within the scope of the invention, which should therefore be construed as limited only by the appended claims

What is claimed is:

1. An externally pressurized porous bearing configured to operate within a refrigerant environment, the externally pressurized porous bearing comprising:
    a porous media face opposing a rotor and configured to distribute an externally pressurized fluid through the porous media face;
    at least one port configured to provide the externally pressurized fluid to the porous media face;
    at least one mount that includes a preloading device configured to provide a preloading pressure between the porous media face and the rotor, wherein the preloading pressure increases pressure and shear heating from rotation of a rotor, thereby increasing the pressure and load capacity of the externally pressurized porous bearing by effecting a phase change of the externally pressurized fluid from a liquid to a gas.

2. The externally pressurized porous bearing of claim 1, wherein the porous media face comprises of one or more of graphite, carbon, silicon carbide, tungsten carbide, alumina, carbon-carbon ceramic matrix composites, and 3D printed materials.

3. The externally pressurized porous bearing of claim 1, wherein the preloading device is adjustable to provide a deterministic pre-load of a bearing gap pressure.

4. The externally pressurized porous bearing of claim 1, wherein the preloading device is a belleville washer.

5. The externally pressurized porous bearing of claim 1, wherein the preloading device is at least one o-ring.

6. The externally pressurized porous bearing of claim 1, wherein the preloading device is an elastomeric pivot.

7. The externally pressurized porous bearing of claim 1, wherein the externally pressurized fluid is refrigerant.

* * * * *